United States Patent Office 3,199,838
Patented Aug. 10, 1965

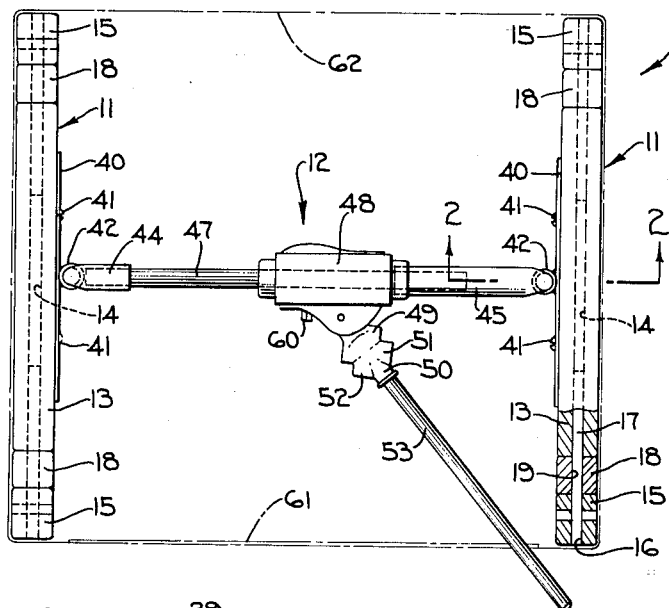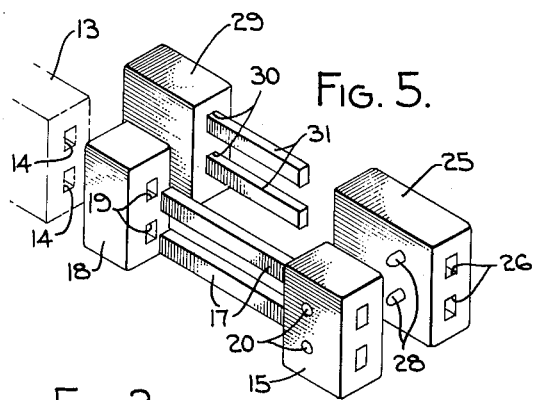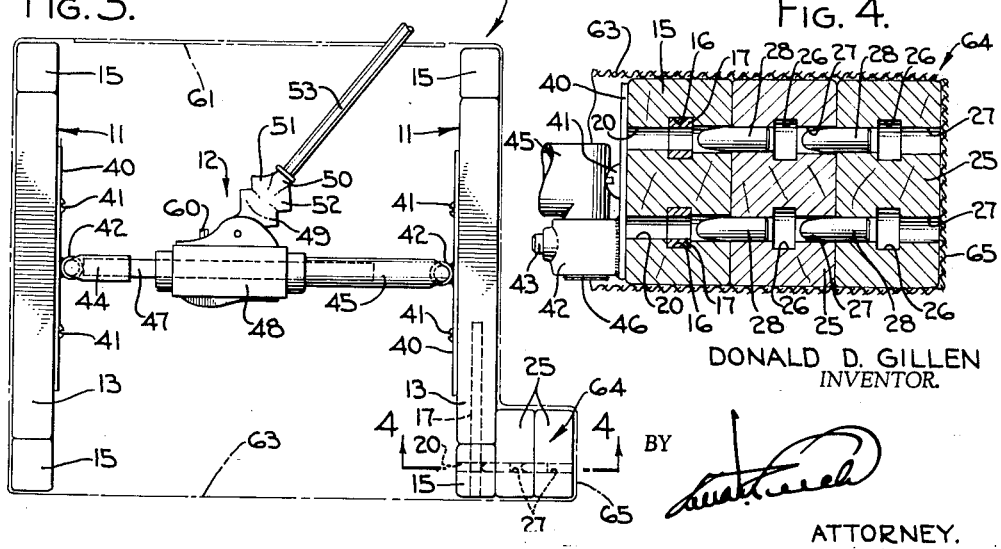

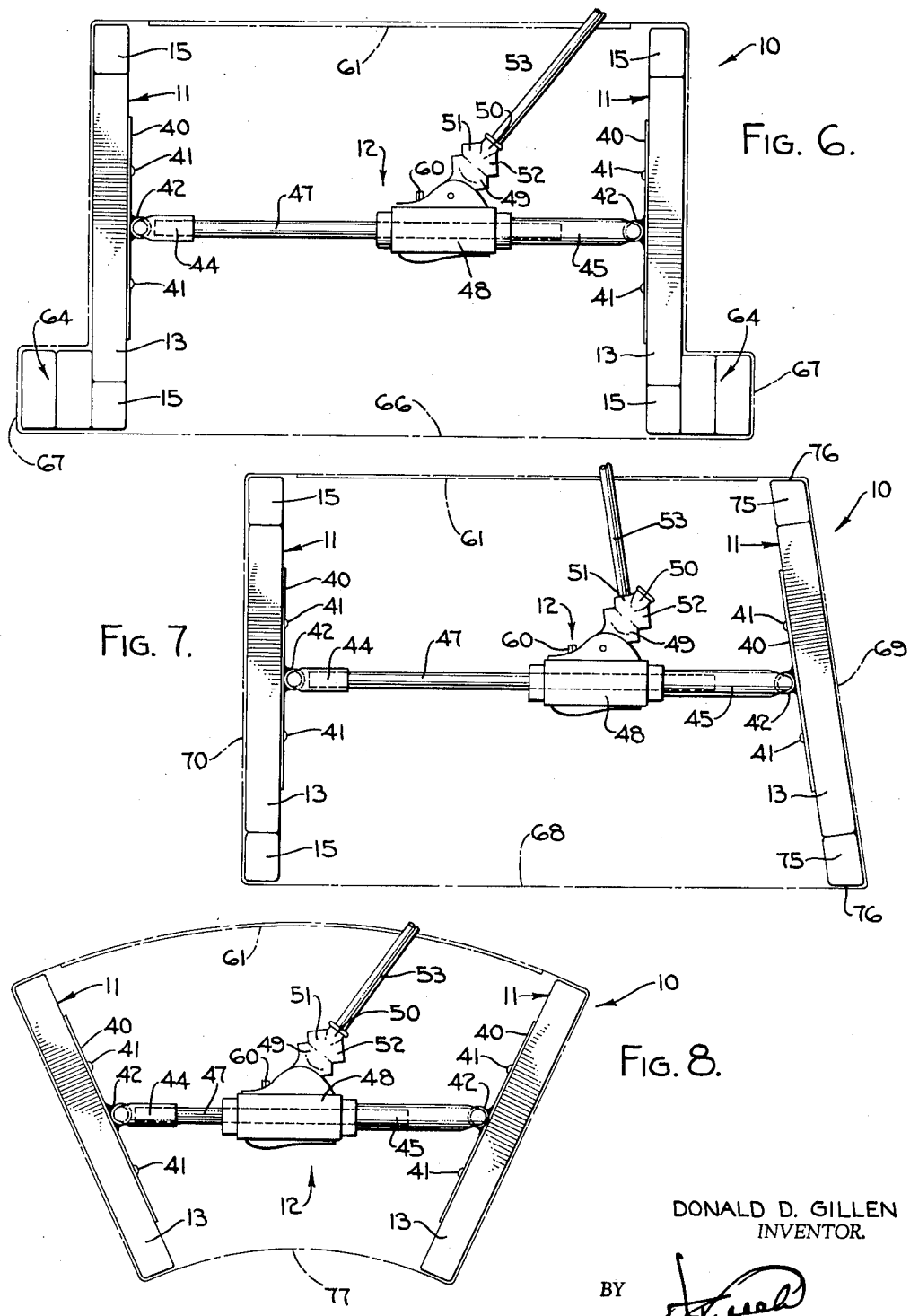

3,199,838
APPARATUS FOR RESIZING UPHOLSTERY
CUSHION CASINGS
Donald D. Gillen, 14609 Manecita Drive,
La Mirada, Calif.
Filed Apr. 1, 1963, Ser. No. 269,578
7 Claims. (Cl. 254—60)

This invention relates to the upholstery cushion cleaning art and particularly to a novel method of and apparatus for restoring upholstery cushion casings to their original size after these have been shrunk by a cleaning or laundering operation.

Heretofore, the restoring of such cushions to their original size has been done by stretching the same on frames provided with a large number of hooks which are hooked into the fabric edges and then pulled apart. This method demands a high degree of skill if the results are to be uniform and up to commercial standards and inferior results are therefore common.

It is an object of the present invention to provide a novel method of and apparatus for resizing upholstery cushion casings the operation of which is so simple and easy to learn that unskilled labor may, after a short training, be depended upon to operate the same and produce uniformly satisfactory results.

Upholstery cushions vary in size and shape. For the most part however they conform to certain conventional shaped patterns including mainly the standard rectangular pattern, the T-shape pattern, the half T-shape pattern, the pattern with one end disposed obliquely, and the "pie-shaped" or segment-of-a-ring pattern having inner and outer edges which are concentric arcs and the side edges formed by radii of the longer arc. The casings for these cushions are tailored to conform to the cushion.

Another object of the invention is to provide a method of and apparatus for resizing upholstery cushion casings after said casings have been shrunk, to restore their original shape and size including casings of all the conventional shape patterns above noted, as well as casings of various sizes in each of said shape patterns.

The manner of accomplishing the foregoing objects as well as further objects and advantages will be made manifest in the following description taken in connection with the accompanying drawings in which FIG. 1 is a diagrammatic plan view of a preferred embodiment of the apparatus of the invention with the end members of the apparatus extended by the use of four extension blocks and four washer blocks and with the end members thus extended inserted through the zipper opening in a casing into end portions of the casing and with the latter casing portions stretched into conformation with the end members and with the jack of the apparatus actuated to tense said casing initially in preparation for the moistening and final stretching steps of the method of the invention.

FIG. 2 is an enlarged detail vertical sectional view taken on the line 2—2 of FIG. 1 and illustrating the pivotal connection between one of the telescopic elements of the jack means of the invention and its pivotal connection with one of said end members. This view also shows the major longitudinal dowel holes of said end members.

FIG. 3 is a view similar to FIG. 1 showing the apparatus of the invention assembled for a resizing operation on a cushion casing of the "half T-shape" pattern requiring the assembly of two lateral boss blocks in dowel connected association with each other and with an extension block of one of the end members of the apparatus and with the latter inserted in said casing and operative to produce the initial tightening of the casing on the apparatus as illustrated in FIG. 1.

FIG. 4 is an enlarged vertical sectional detail view taken on the line 4—4 of FIG. 3 and illustrating the dowel means employed to temporarily maintain the lateral boss blocks in a given assembled relation with each other and with one of the extension blocks of the invention.

FIG. 5 is a diagrammatic exploded perspective view of the manner of making major and minor dowel connections between one of the end members of the apparatus and the various blocks employed by the invention to extend said end member and form lateral bosses of various shapes thereon.

FIG. 6 is a view similar to FIG. 3 and illustrates the apparatus of the invention assembled for a resizing operation on a casing with a "T-shape" pattern and illustrates the step in performing the method of the invention in which the casing is initially tightened over the apparatus.

FIG. 7 is a view similar to FIG. 1 and illustrates the assembly of the apparatus of the invention in a form adapting it to be used in resizing a cushion casing having one end portion disposed obliquely to the side walls of the cushion and with the casing initially tightened over the apparatus as an intermediate step in resizing the casing.

FIG. 8 is a plan view of the apparatus of the invention assembled for the resizing of a "pie-shaped" cushion casing and with the end members of the apparatus both symmetrically inclined relative to the telescoping elements of the jack means of the invention so as to fit opposite end portions of said casing, and this view shows the casing initially tensed over the apparatus as an intermediate step in resizing said cushion.

Referring specifically to the drawings, the apparatus 10 of the invention is there shown as including a pair of end members 11 and a jack mechanism 12.

The end members 11 may comprise merely base blocks 13 as shown in FIG. 8 or they may comprise said base blocks with these extended lengthwise and laterally so as to fit the various patterns of cushion casings which the apparatus 10 is provided to resize. Instances of such composite end members 11 are shown in FIGS. 1, 3, 6 and 7.

The base blocks 13, as well as all of the other blocks included in the apparatus 10, are preferably made of ash two-by-fours, surfaced four sides and rounded on the corner edges, the net cross sectional dimension being preferably about 3½ inches by 1¾ inches. The base blocks 13 are preferably about 14 inches long and are provided with two rectangular dowel holes 14 which extend throughout the length of the blocks. Optionally associated with the base blocks 13 in the formation of end members 11 are extension blocks 15 having longitudinal dowel holes 16 which are of the same size and longitudinally aligned with dowel holes 14 of base blocks 13 when extension blocks 15 are placed in abutment with and extension of said base blocks. Cemented in said dowel holes 16 are relatively long aluminum dowel pins which slidably extend into dowel holes 14. Washer blocks 18 are also provided, these having dowel holes 19 which are positioned to receive the dowel pins 17 so that one or more of said washer blocks may be employed for adding to the extension provided by one of the extension blocks 15 as shown in FIG. 1.

Each extension block 15 also has lateral dowel holes 20 which have the same spacing as dowel holes 16 and lie in the same horizontal plane therewith but which are somewhat smaller in size and preferably are round. Four boss blocks 25 are also provided in the apparatus 10, each of these blocks having longitudinal dowel holes 26 which are located in said blocks in identically the same relation thereto as the dowel holes 14 are located in the base blocks 13. Boss blocks 25 also have lateral dowel holes 27 which are of the same cross sectional area and location as the lateral dowel holes 20 in extension blocks 15. Cemented in dowel holes 27 to extend laterally in one direction from each of the boss blocks 25 are round dowel pins 28. Thus one of the boss blocks 25 may be temporarily united with one of the extension blocks 15 by merely pressing the dowel pins 28 into the lateral dowel holes 20 in that extension block. A lateral boss is thus formed by this boss block on said extension block. If circumstances under which the apparatus 10 is being used require this boss to be twice as thick laterally as the lateral dimension of one block, a second boss block 25 may be added to the first boss block by inserting the dowel pins 28 of the second boss block into the outwardly disposed portions of the dowel holes 27 of the first boss block 25 as shown in FIGS. 3 and 4.

The apparatus 10 also includes boss extension blocks 29, each of which is provided with longitudinal dowel holes 30 which are identical in cross section and location with dowel holes 14, 16 and 19 previously described. Aluminum dowel pins 31 are cemented in holes 30 of block 29 so that the latter block may be employed as a longitudinal extension of one of the boss blocks 25 by inserting the dowel pins 31 into the longitudinal dowel holes 26 in that boss block. The dowel pins 31 are of sufficient length so that these will accommodate one or more washer blocks 18 and still leave enough of the dowel pins 31 protruding to unite the assembled boss extension block and washer blocks with one of the boss blocks 25. The jack mechanism 12 of the invention includes a pair of metal plates 40 which are secured by screws 41 to inner faces of the base blocks 13, each of these plates having welded thereto a simple pivot bearing sleeve 42 having a set screw 43. The jack mechanism 12 also includes telescopic tubular end elements 44 and 45 the outer end of each of which is provided with a pivot pin 46 welded thereon and extending at right angles therefrom, each of these pivot pins making a snug rotatable fit in one of the bearing sleeves 42. The bearing sleeves 42 are offset downwardly so that when the pivot pins are so received into these sleeves, the axes of tubular elements 44 and 45 lie in the horizontal medial plane of the apparatus 10. A plurality of rods 47 of different lengths are provided with the apparatus 10 which slidably fit within tubular elements 44 and 45 to accommodate the setting up of this apparatus for use with cushion casings of different lengths.

The jack mechanism 12 also includes a conventional bar jack 48 having an actuating rocker 49 having three recesses 50, 51 and 52 in which a handle 53 may be selectively inserted for actuation of said rocker. The bar jack 48 also has a release trigger 60 for releasing said jack so that operation of the rocker will reverse the action of the jack.

Operation

In the operational views of FIGS. 1, 3, 6, 7 and 8, the apparatus 10 is shown assembled in various forms for performing the method of the invention in resizing cushion casings of various typical shape patterns. In each of these views the casing is shown in broken lines, the outside of the casing being shown by a single broken line while the zipper controlled opening 61 in each casing is shown by a double broken line.

FIG. 1 shows the apparatus 10 assembled for resizing a simple rectangular cushion casing 62 of a length requiring the use of a medium length bar 47 and of a width requiring the use of an extension block 15 and washer block 18 for extending each of the opposite ends of each of the base blocks 13 in making up the end members 11 of the apparatus.

FIG. 3 illustrates the apparatus assembled for resizing a half T-shape cushion casing 63 which is relatively short so that the shortest one of the bars 47 is employed in the apparatus 10 and in which the end members 11 comprise the base blocks 13 lengthened at each end by the application thereto of one of the extension blocks 15, and with two boss blocks 25 assembled laterally on one of the extension blocks 15 to provide a boss 64 for filling out an endwise extension 65 of casing 63.

FIG. 6 illustrates the apparatus 10 made up to resize a cushion casing 66 having a T-shape pattern for which a longer one of the bars 47 is employed in the jack mechanism and bosses 64 are provided in symmetrical relation on each of the end members 11 for filling out endwise extensions 67 of said casing.

The apparatus 10 is shown in FIG. 7 as set up for resizing a relatively long cushion casing 68 which falls in the shape pattern in which one end portion 69 of said casing is disposed obliquely relative to the longitudinal axis of said cushion whereas the other end portion of said casing is normal to the longitudinal axis thereof. In meeting this condition, the jack mechanism 12 is assembled with one of the longer bars 47 of the apparatus and one end member 11 is fixed in its proper oblique relationship with tubular element 45 of the jack mechanism 12 by loosening up the set screw 43 controlling rotation between said end member and said tubular element and resetting said screw after the proper angular relation has been obtained. The end member 11 thus obliquely inclined is shown in FIG. 7 as employing extension blocks 75 which are just like extension blocks 15 excepting that their end edges 76 are inclined so as to lie parallel with the longitudinal axis of the casing 68 illustrated in this view.

The operational view of FIG. 8 shows the apparatus 10 set up and applied to a cushion casing 77 for resizing the same, this casing being of the so-called "pie-shaped" pattern. This shape might more accurately be described as that of a sector of a ring, the side edges of the casing being formed by concentric arcs and the end edges of the casing being formed by radii of the larger arc. As set up for resizing the casing 77, the apparatus 10 employs the base blocks 13 alone as the end members 11 of the apparatus and uses a relatively short one of the bars 47 in the jack mechanism 12, and the end members 11 are rigidly set at equal oblique angles relative to the jack mechanism so that when the apparatus 10 is inserted through the zipper opening 61 into the casing 77 with end portions of the casing stretched into conformity with the end members 11 and the apparatus extended so as to just tighten the casing on the end members 11 as shown in FIG. 8, these end members will conform to the natural angles of the end portions of the casing 77.

The preparation of the apparatus 10 of the invention for use in resizing each of five different shape patterns of an upholstery cushion casing having been above described, it is to be noted that there is no substantial difference in the employment of apparatus 10 for performance of the method of the invention in each of these instances after the apparatus has been prepared to fit the particular casing involved. A description of a single instance of the performance of the method of the invention, will therefore suffice to describe any performance of this regardless of the difference in the form of the apparatus 10 in order to cause this to fit opposite end portions of the particular casing to be resized.

The performance of the method really starts with taking accurate measurements of the cushion of the casing to be resized while this is confined in said casing and before the cushion has been removed from the casing in order to clean or launder the casing. This measurement can be made, if desired, by laying the cushion with its casing on a sheet of paper and the outline of the cushion marked on the paper with a pencil by running the latter around the outer edge of the cushion. This outline, therefore, will indicate the shape and size, in outline, of the casing before it is shrunk and to which the casing is to be returned in the resizing operation.

In preparing the apparatus 10, therefore, so that the end members 11 will accurately fit inside of end portions of the casing to be resized when this casing has been brought back to its original size, the preparation of the apparatus for the resizing operation may be and preferably is made by assembling the apparatus 10 so it fits the form of the casing shown by the pencil outline of the same on said paper. The best way of doing this is to lay the apparatus directly on the paper while assembling the apparatus. On the other hand, if there is no need of the apparatus for other uses during the laundering of a particular cushion casing, the apparatus may be assembled for use on that casing by laying the apparatus on top of the cushion before the casing has been removed therefrom for laundering.

With the apparatus properly assembled for use in resizing a particular cushion casing and with the latter laundered and presumably shrunk from its original size so as to require resizing, the jack mechanism 12 is shortened to its minimum length to bring the end members 11 close enough together so that the entire apparatus 10 may be inserted broadside through the zipper controlled opening 61 of the casing and with end members 11 disposed within opposite end portions of the casing. With the release trigger 60 set so as to cause positive inching of the bar jack 48 along the bar 47 when the handle 53 is rocked back and forth, and with the apparatus loosely inserted into the particular cushion casing to be resized, the handle 53 is thus actuated to inch the bar jack 48 against the tubular element 45 which causes the bar 47 to be withdrawn from said tubular element thereby expanding the apparatus 10 by shifting the end members 11 apart. Each of the operation views of FIGS. 1, 3, 6, 7 and 8 shows the result of actuation of the jack mechanism 12 at this point in the process just up to where a casing is snugly tightened over the end members 11 of the apparatus and without applying a substantial degree of tension to the casing.

With the casing in each instance thus tightened on the end members 11 of the apparatus with the latter members carefully preshaped to conform to the configuration of end portions of said casing, the casing is now sprayed with an aqueous solution of acetic acid made by adding two ounces of the acid to one gallon of water, until the casing is damp. The amount of moisture applied to the casing in this step varies with the amount of shrinkage which the casing has suffered in the laundering step. In other words, the greater the shrinkage, the wetter the casing should be before starting the stretching operation.

After the cover is completely dampened in the preceding step, the pumping of handle 53 is resumed, using a full stroke to actuate the bar jack 48, each such actuation expanding the end members 11 of the apparatus approximately one-half of an inch. During the expanding operation, the casing and apparatus may be laid over the sheet of paper on which the original size of the casing has been marked so as to indicate when the casing has been returned to its original size so that the expansion of the casing can be immediately stopped. If it is not practical to record the original size of the casing by an outline on paper as above described, measurements may be taken of the casing on the cushion before the cushion is taken out for laundering the casing and these measurements used to check the resizing operation so that it is stopped exactly at the point where the original size of the casing has been recaptured.

The next step in the method is to allow the casing to fully dry while it is on the expanded apparatus 10. The drying may of course be expedited by applying currents of warm air to the casing so as to cut down the period of time that the apparatus 10 is devoted to resizing a single casing. As soon as the casing is dried, it is ready for removal from the apparatus 10. This is accomplished by shifting the release trigger 60 to reverse the bar jack 48 so that working the handle 53 will reversely shift the bar jack 48 to cause the end members 11 to shift together so that the apparatus 10 may readily be removed through the zipper controlled opening 61 of the casing. A collapsing of the apparatus 10 in this step so that it can readily be removed from the casing, may be expedited by setting the stretched casing on its end while reversing the bar jack 48 which will cause the bar jack to be followed downwardly by the uppermost of the end members 11 until the apparatus 10 is collapsed sufficiently to remove it from the casing.

Immediately after removing the apparatus 10 from the casing it has been used to resize, the foam filler of the casing should be reinserted in the casing and the zipper controlled opening 61 of the latter should be closed.

While, as above pointed out, a dilute aqueous solution of acetic acid is preferably employed as the dampening agent in preparing the fabric of a casing for the final stretching step of the method, it is to be understood that there are other expedients which can be employed to loosen up the material of the fabric to permit this to be stretched such as steaming the same.

While only a single embodiment of the apparatus of the invention has been herein disclosed, it is to be understood that various changes and modifications may be made in this without departing from the spirit of the invention or the scope of the appended claims.

The claims are:

1. In an apparatus for resizing a shrunken cushion casing, the combination of: a pair of end members which are approximately of the right shape and dimensions to fit within and conform to opposite end portions of said casing prior to the latter having been shrunk, which members are adapted to be inserted through an opening in one side edge of said shrunken casing and have said end portions of the latter manually stretched into conformation with said members, said members being provided with dowel holes extending lengthwise therein and opening at opposite ends of said members; extension blocks having dowel pins fitting into said holes to form endwise extensions of said members which blocks are optionally assembled on said members to vary the length of the latter to fit casings varying in size; and expandable jack means insertable through said opening to hold said members in spaced relation and operable through said casing opening to expand said members to stretch said casing endwise by precisely that amount required to restore said casing to its original size and shape, said jack means being collapsible after said casing has set in its resized shape and size for removing said apparatus through said opening from said casing.

2. A combination as recited in claim 1 wherein said dowel holes and dowel pins are relatively long; and relatively thin washer blocks having like holes adapted to be penetrated by said dowels for making relatively short additions to the length of one of said members in adjusting such length to fit snugly within an end portion of a casing of a particular size.

3. A combination as recited in claim 1 wherein said extension blocks are provided with transversely aligned outwardly opening dowel holes; and boss blocks having transversely projecting relatively short dowel pins adapted to fit into said transverse dowel holes to form a laterally extending boss on one or both of said extension blocks to fit correspondingly shaped enlargements in end portions of a casing.

4. A combination as recited in claim 3 wherein certain of said boss blocks have longitudinal dowel holes and other of said boss blocks have longitudinal dowel pins for connecting two of said boss blocks together longitudinally to produce a longer boss.

5. A combination as recited in claim 3 wherein certain of said boss blocks have outwardly opening dowel holes aligned with the inwardly extending dowel pins thereof whereby other of said boss blocks can be dowel connected to said certain boss blocks to increase the lateral dimension of one or more lateral bosses being formed on one or more of said extension blocks.

6. In an apparatus for resizing a shrunken cushion casing, the combination of: a pair of end members which are approximately of the right shape and dimensions to fit within and conform to opposite end portions of said casing prior to the latter having been shrunk, which members are adapted to be inserted through an opening in one side edge of said shrunken casing and have said end portions of the latter stretched into conformation with said members; and expandable jack means insertable through said opening to hold said members in spaced relation and operable through said casing opening to expand said members to stretch said casing endwise precisely that amount required to restore said casing to its original size and shape, said jack means being collapsible after said casing has set in its resized size and shape, for removing said apparatus through said opening from said casing, each of said members being extensible in length symmetrically with respect to the connection between said members and one of said jack elements to fit end portions of casings varying in length, the symmetrical extension of each of said members being accomplished by providing blocks removably interfitting with end portions of said member to form extensions of the latter having the same cross-sectional shape as said member and axially aligned therewith in end-to-end abutting relation.

7. In an apparatus for resizing a shrunken cushion casing, the combination of: a pair of end members which are approximately of the right shape and dimensions to fit within and to conform to opposite end portions of said casing prior to the latter having been shrunk, which members are adapted to be inserted through an opening in one side edge of said shrunken casing and have said end portions of the latter stretched into conformation with said members; and expandable jack means insertable through said opening to hold said members in spaced relation and operable through said casing opening to expand said members to stretch said casing endwise precisely that amount required to restore said casing to its original size and shape, said jack means being collapsible after said casing has set in its resized size and shape, for removing said apparatus through said opening from said casing, each of said members being extensible in length symmetrically with respect to the connection between said member and one of said jack elements to fit end portions of casing varying in length, boss blocks being provided which removably interfit with said extended members to form lateral outward bosses optionally on one or both of said members to cause each member so provided with a boss to conform to an end portion of a casing having a T or half-T pattern.

References Cited by the Examiner

UNITED STATES PATENTS

| | | | |
|---|---|---|---|
| 594,963 | 12/97 | Orfeur | 223—19 |
| 841,773 | 1/07 | Fitzgerald. | |
| 867,531 | 10/07 | Potter | 254—101 |
| 1,349,576 | 8/20 | Markham | 254—106 |
| 1,372,005 | 3/21 | Brandt | 254—106 |
| 1,688,088 | 10/28 | Nakashian | 26—51 |
| 2,974,931 | 3/61 | Reel et al. | 254—106 |

WILLIAM FELDMAN, *Primary Examiner.*

MILTON S. MEHR, *Examiner.*